(12) United States Patent
Hirose et al.

(10) Patent No.: US 7,729,217 B2
(45) Date of Patent: Jun. 1, 2010

(54) OPTICAL DISC DEVICE FOR RECORDING AND REPRODUCING INFORMATION ON AND FROM A WRITE-ONCE-TYPE DISC USING LASER LIGHT

(75) Inventors: Ken Hirose, Gifu (JP); Noboru Mamiya, Mizuho (JP); Kenji Nakao, Gifu (JP); Satoshi Sumi, Gifu (JP); Koichi Kawakami, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 970 days.

(21) Appl. No.: 11/076,965

(22) Filed: Mar. 11, 2005

(65) Prior Publication Data
US 2005/0213452 A1 Sep. 29, 2005

(30) Foreign Application Priority Data
Mar. 25, 2004 (JP) ............................. 2004-088708
Jan. 20, 2005 (JP) ............................. 2005-013345

(51) Int. Cl.
*G11B 7/00* (2006.01)
(52) U.S. Cl. .................................... 369/47.53; 369/116
(58) Field of Classification Search ............. 369/47.53, 369/53.26, 116
See application file for complete search history.

(56) References Cited
U.S. PATENT DOCUMENTS
6,169,714 B1 * 1/2001 Tanaka et al. ............. 369/44.28
7,102,974 B2 * 9/2006 Tsukihashi et al. ........ 369/53.24
7,304,927 B2 * 12/2007 Hanamoto ............... 369/47.53
7,327,651 B2 * 2/2008 Nakao et al. ............. 369/47.53

FOREIGN PATENT DOCUMENTS
CN 1372257 A 10/2002
JP 7-244930 9/1995

(Continued)

OTHER PUBLICATIONS
Japanese Office Action issued in corresponding Japanese Patent Application No. JP 2005-013345, dated Feb. 13, 2007.

(Continued)

*Primary Examiner*—Wayne R Young
*Assistant Examiner*—LaTanya Bibbins
(74) *Attorney, Agent, or Firm*—McDermott Will & Emery LLP (57) ABSTRACT

The present invention aims to smoothly and adequately adjust recording laser power while an increase in processing load during recording is suppressed. When a recording operation start request is received, OPC is executed with reference to a target β value (βt) of a disc to set recording laser power Pws. Recording operation is performed based on the set recording laser power Pws. When a system is brought into an intermittent standby state, R-OPC is executed, so the recording laser power Pws is adjusted and set again. Then, its subsequent recording operation is performed based on the recording laser power Pws which is set again. When a duration of the recording operation exceeds a maximal waiting time Ts, the recording operation is suspended so that the system is set to a recording standby state. Then, the R-OPC is executed, so that the recording laser power Pws is adjusted and set again.

5 Claims, 7 Drawing Sheets

FOREIGN PATENT DOCUMENTS

| | | |
|---|---|---|
| JP | 9-167371 | 6/1997 |
| JP | 2001-283439 | 10/2001 |
| JP | 2001-297439 | 10/2001 |
| JP | 2001-344753 | 12/2001 |
| JP | 2002-260230 | 9/2002 |
| JP | 2003-331426 | 11/2003 |

OTHER PUBLICATIONS

Chinese Office Action, with English translation, issued in Chinese Patent Application No. CN 200510059075.8 mailed on May 19, 2007.

\* cited by examiner

OPTICAL DISC DEVICE FOR RECORDING AND REPRODUCING INFORMATION ON AND FROM A WRITE-ONCE-TYPE DISC USING LASER LIGHT

BACKGROUND OF THE INVENTION

1. Field of the Invention

The present invention relates to an optical disc device for recording and/or reproducing information by using laser beams, which is particularly suitable for adjusting a set value of laser power.

2. Description of the Related Art

Recently, various optical recording media such as a compact disc (CD) and a digital versatile disc (DVD) have been commercialized and are widely available. With respect to the optical recording media, in general, laser power is optimized on a system side before recording/reproducing operations because optimum laser power is changed according to a medium.

For example, laser power setting processing using a β value is performed for a CD-R and a DVD-R. That is, test data is recorded with predetermined laser power on a trial write area formatted on the medium. A β value is obtained from an amplitude value of a reproduced RF signal (asymmetry) of the test data. Recording Laser power is set such that the obtained β value becomes a target β value required for the medium (disc).

For example, a method described in JP 2002-260230 A has been known as a method of setting recording laser power using the β value.

When a system state (medium temperature etc.) changes after the setting of the recording laser power as described above, for example, the recording sensitivity of the medium is changed from an initial state. With this change, the recording laser power initially set is gradually deviated from an adequate value. In order to solve such a problem, on the system side, the initially set recording laser power is generally adjusted as appropriate according to a current system state.

For example, in a system for performing recording/reproducing on the CD-R and the DVD-R, a reflection light intensity caused by the initially set recording laser power is held as an amplitude level of a photo detector. An amplitude level obtained during recording operation is compared with the amplitude level in the case of the initially set recording laser power. A set value of the recording laser power is dynamically changed so that both amplitude levels become equal to each other.

However, in this case, it is necessary to perform processing for adjusting the laser power in parallel with the recording operation. Therefore, a processing sequence performed during the recording operation, which has been regarded as complicated up to now, is further complicated, so such a problem that a processing load to a microcomputer further increases occurs.

In recordable media using as a material for a recording layer an organic dye material, for example, a CD-R and a DVD-R, the sensitivity of the recording layer depends on a wavelength of laser light. Therefore, when a wavelength of laser light emitted from a semiconductor laser is varied with a change in temperature of the semiconductor laser, a phenomenon in which a recording state is changed according to the wavelength even in the case of the same intensity occurs. Thus, as described above, when the amplitude level of the reflection light is monitored to adjust the laser power, there occurs such a problem that the laser power cannot be adequately adjusted.

SUMMARY OF THE INVENTION

The present invention has been made to solve the above-mentioned problems. An object of the present invention is to provide an optical disc device capable of smoothly and adequately adjusting recording laser power while an increase in processing load during recording operation is suppressed.

The present invention provides an optical disc device for recording and reproducing information on and from a disc using laser light, which is characterized by including: laser power setting means for setting recording laser power by trial writing in the disc; and laser power adjusting means for adjusting a set value of the recording laser power which is set by the laser power setting means based on a state of a reproduction signal of previously recorded recording information which is reproduced during an intermittent standby period other than a recording operational period.

In the optical disc device according to the present invention, the laser power adjusting means may reproduce recording information corresponding to blocks recorded immediately before the intermittent standby period and adjust the set value of the recording laser power based on a state of a reproduction signal of the recording information.

In addition, the laser power setting means may set the recording laser power based on a target value of the reproduction signal which is required for the disc and the laser power adjusting means may compare a parameter value obtained from the reproduction signal with the target value and determine an adjustment value for the set value of the recording laser power based on a result obtained by comparison.

Furthermore, the laser power setting means may set, when referencing a β value, the recording laser power based on a target β value of the reproduction signal which is required for the disc, and the laser power adjusting means may compare a β value obtained from the reproduction signal with the target β value, and add or subtract a predetermined adjustment value to or from the set value of the recording laser power based on a relationship between the β value and the target β value.

In this case, the laser power adjusting means may subtract the predetermined adjustment value from the set value of the recording laser power when the β value obtained from the reproduction signal is larger than the target β value, and add the predetermined adjustment value to the set value of the recording laser power when the β value obtained from the reproduction signal is smaller than the target β value.

Further, in the optical disc device according to the present invention, when a duration of the recording operation exceeds a predetermined set time, the laser power adjusting means may suspend the recording operation, set the intermittent standby period, and adjust the recording laser power during the set intermittent standby period.

As described above, when the recording operation is suspended to adjust the recording laser power, a recording state may be returned to the recording operation in response to the completion of the recording laser power adjustment.

According to the present invention, the recording laser power adjusting processing is performed during the intermittent standby period other than the recording operational period. Therefore, the laser power adjusting processing is not performed in parallel with the recording operation, with the result that complication of a processing sequence in recording can be prevented to reduce a processing load to a microcomputer.

According to the present invention, information which has been recorded by the previous recording operation is reproduced and the recording laser power is adjusted based on the state of the reproduction signal. For example, even when sensitivity of a recording layer is changed by wavelength shift of the laser light, it is possible to set an adequate power adjustment value. Therefore, the recording laser power can be smoothly adjusted while a recording characteristic is improved.

In particular, the recording information corresponding to several blocks recorded immediately before the intermittent standby period is reproduced to adjust the recording laser power. Therefore, an adjustment value of the recording laser power to be applied to next recording operation can be set based on a reproduction signal of recording information close to the next recording operation in terms of time and position. Thus, the adjustment value for the next recording operation can be set without an error.

Further, when the duration of the recording operation exceeds the maximal waiting time, the recording operation is suspended and the recording laser power adjusting processing is executed. Therefore, it is possible to prevent the previous undesirable recording laser power from being maintained, so that the set value of the recording laser power can be smoothly adjusted.

Note that the "intermittent standby period" in the present invention indicates a period during which a system is in a recording standby state between the recording operation of a sequence and the recording operation of a next sequence shifted therefrom.

BRIEF DESCRIPTION OF THE DRAWINGS

The above and other objects and novel features of the present invention will become apparent from the following detailed description of embodiments taken in conjunction with the accompanying drawings, in which.

DETAILED DESCRIPTION OF THE PREFERRED EMBODIMENTS

Hereinafter, embodiments of the present invention will be described in detail with reference to the drawings. It is to be expressly understood, however, that the following embodiments are for the purpose of illustration only and are not intended to limit the scope of the present invention.

Figure 1:
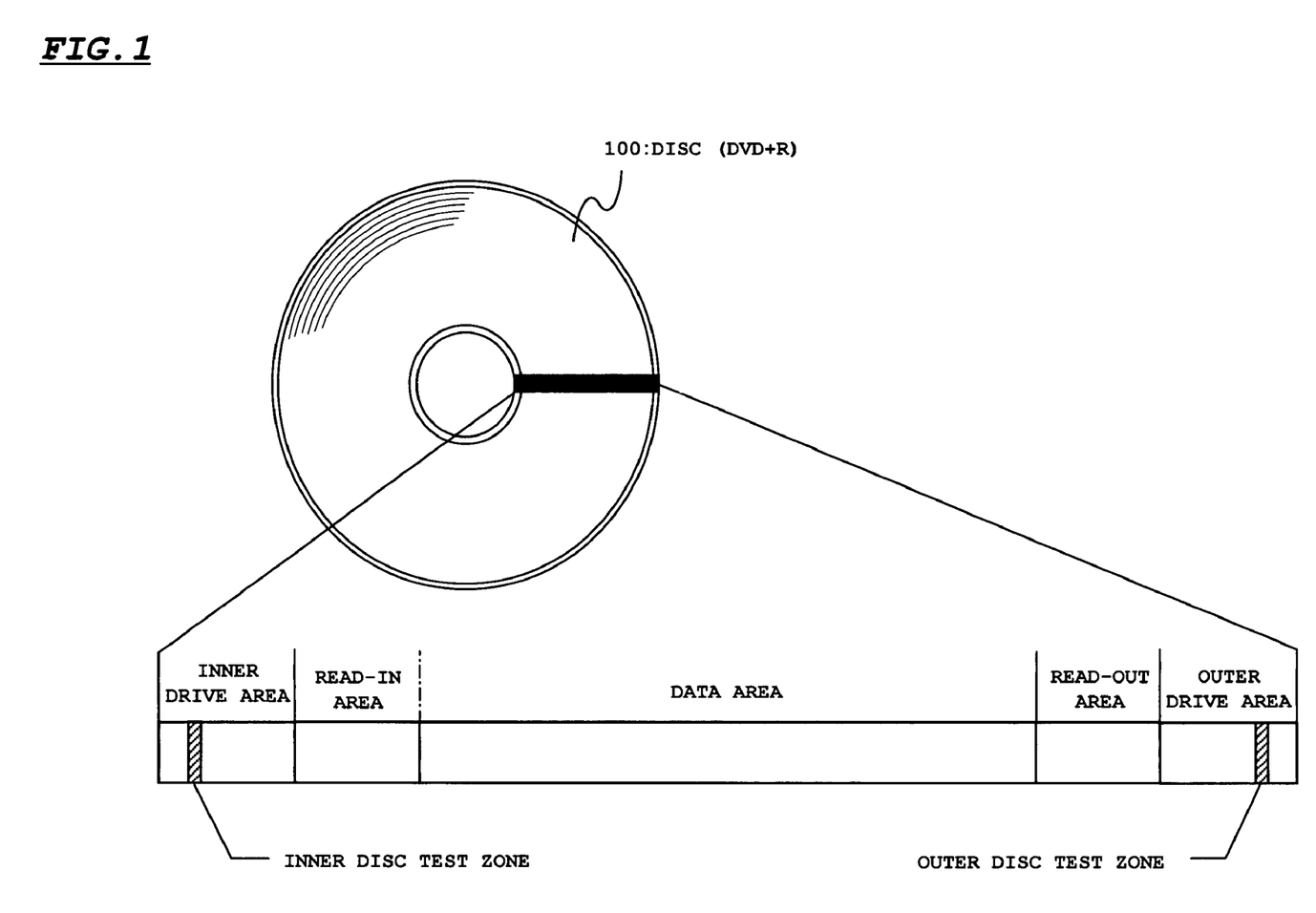
FIG. 1 shows a structure of an optical disc according to an embodiment of the present invention.

FIG. 1 shows a structure of a disc (DVD+R) according to an embodiment of the present invention. As shown in FIG. 1, a disc 100 is divided into an inner drive area, a read-in area, a data area, a read-out area, and an outer drive area in a radius direction of the disc 100. The inner drive area and the outer drive area each are classified into various zones. Of the various zones, an inner disc test zone and an outer disc test zone are used to perform laser power setting (optimum write power control (OPC)).

In the disc 100, spiral grooves are formed from the inner circumference to the outer circumference. Data is recorded in the grooves. Here, the grooves are meandered (wobbled) in the radius direction. Address information are held by the wobble. That is, a phase modulation section which is called an address in pre-groove (ADIP) is inserted into a monotonic meandering section at regular intervals. When the phase modulation section is scanned with a beam, address information on the grooves are read based on a change in intensity of reflection light and reproduced. Various control data for the disc 100 are recorded in ADIPs of the read-in area by phase modulation. The control data include identification information of a disc manufacturer by whom the disc 100 is manufactured (manufacture ID).

Figure 2:
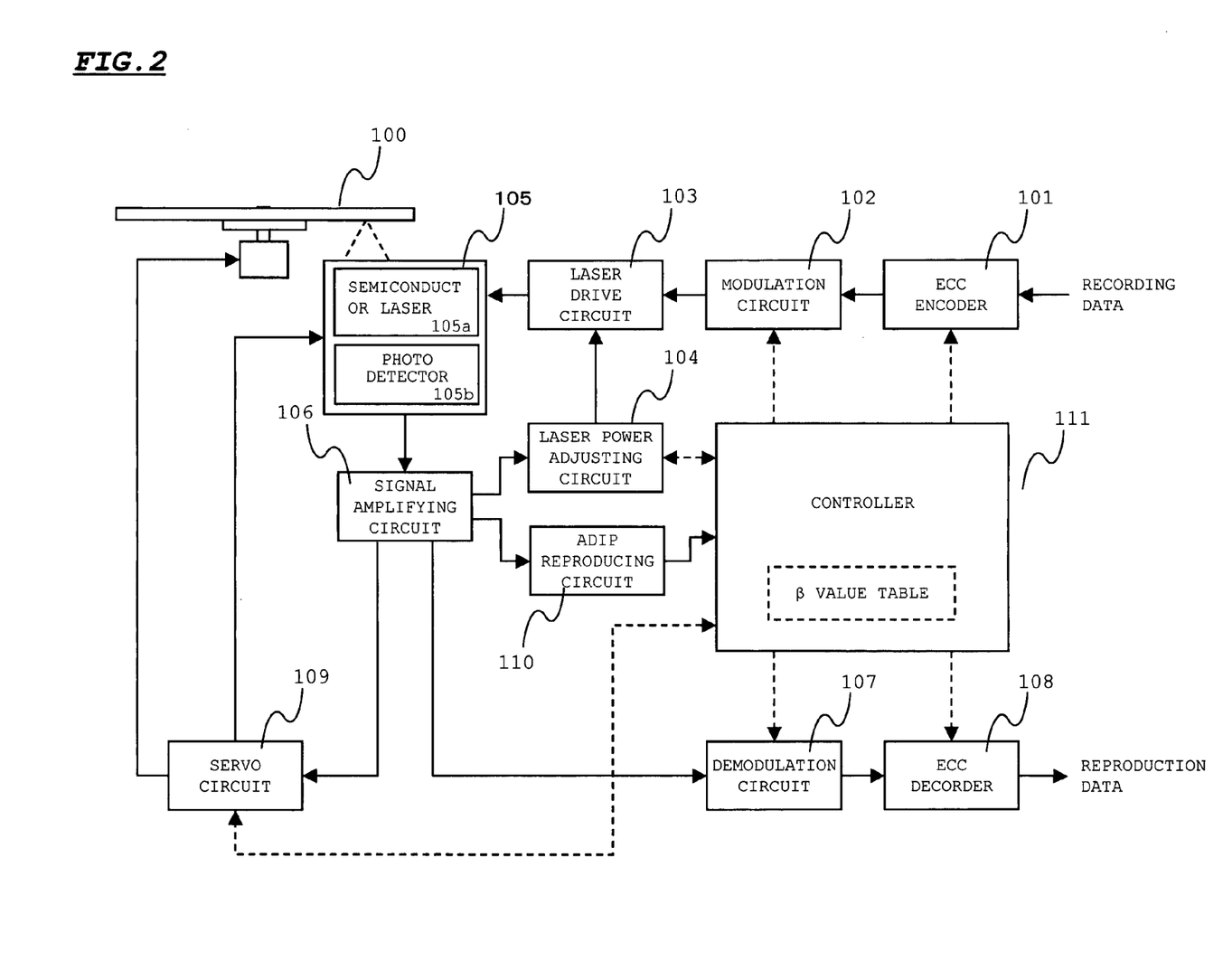
FIG. 2 shows a configuration of the optical disc according to the embodiment of the present invention.

FIG. 2 shows a configuration of an optical disc device according to an embodiment of the present invention.

As shown in the figure, the optical disc device includes an ECC encoder 101, a modulation circuit 102, a laser drive circuit 103, a laser power adjusting circuit 104, an optical pickup 105, a signal amplification circuit 106, a demodulation circuit 107, an ECC decoder 108, a servo circuit 109, an ADIP reproducing circuit 110, and a controller 111.

The ECC encoder 101 adds an error correction code to inputted recording data and outputs the resultant data to the modulation circuit 102. The modulation circuit 102 performs predetermined modulation on the inputted recording data and further generates a recording signal to output the resultant data to the laser drive circuit 103. The laser drive circuit 103 outputs a drive signal corresponding to the recording signal inputted from the modulation circuit 102 to a semiconductor laser 105a at the time of recording and outputs a drive signal for emitting a laser beam having a constant intensity to the semiconductor laser 105a at the time of reproduction. The laser power is adjusted/set to a laser power which is set by the laser power adjusting circuit 104.

The laser power adjusting circuit 104 sets the initial laser power for recording or reproduction and also adjusts the set laser power as appropriate according to an adjustment value supplied from the controller 111. The laser power adjusting circuit 104 then outputs the adjusted laser power to the laser drive circuit 103. Here, initial laser power is set by a β method. That is, a β value (β target) of the disc 100 is obtained from the controller 111. Recording laser power to the disc 100 is set based on the obtained β target. Note that detailed setting processing will be described later.

The optical pickup 105 includes the semiconductor laser 105a and a photodetector 105b, and writes and reads data to and from a disc by converging a laser beam to the grooves of the disc. Note that the optical pickup 105 further includes an objective lens actuator for adjusting the irradiation state of the laser beam onto the grooves and an optical system for guiding the laser beam irradiated from the semiconductor laser 105a to an objective lens and also guiding light reflected by the disc 100 to the photodetector 105b.

The signal amplification circuit 106 amplifies and performs computation of a signal received from the photodetector 105b to generate various types of signals, and outputs the signals to corresponding circuits. The demodulation circuit 107 demodulates a reproduction RF signal inputted from the signal amplification circuit 106 to generate reproduction data and outputs the reproduction data to the ECC decoder 108.

The ECC decoder 108 performs an error correction on the reproduction data inputted from the demodulation circuit 107 and outputs the resultant data to a subsequent circuit.

The servo circuit 109 generates a focus servo signal and a tracking servo signal from a focus error signal and a tracking error signal which are inputted from the signal amplification circuit 106 and outputs the focus servo signal and the tracking servo signal to the objective lens actuator of the optical pickup 105. Further, the servo circuit 109 generates a motor servo signal from a wobble signal inputted from the signal amplification circuit 106 and outputs the motor servo signal to a disc drive motor. Furthermore, the servo circuit 109 generates a tilt servo signal from a tilt error signal supplied from the controller 111 and outputs the tilt servo signal to the objective lens actuator of the optical pickup 105.

The ADIP reproducing circuit 110 reproduces address information and various control information based on the wobble signal inputted from the signal amplifying circuit 106 and outputs the address information and the control information to the controller 111.

The controller 111 includes an internal memory that stores various data and controls respective parts according to preset programs. Note that the controller 111 has a β value table for associating manufacture IDs with target β values (β targets). The controller 111 compares the manufacture ID obtained from the read-in area (ADIP) of the disc 100 with the β value table, reads out a corresponding β target, and outputs the read-out β target to the laser power adjusting circuit 104. The laser power adjusting circuit 104 sets initial recording laser power based on the outputted β target.

Next, laser power setting operation (OPC) of the laser power adjusting circuit 104 will be described.

Figure 3:
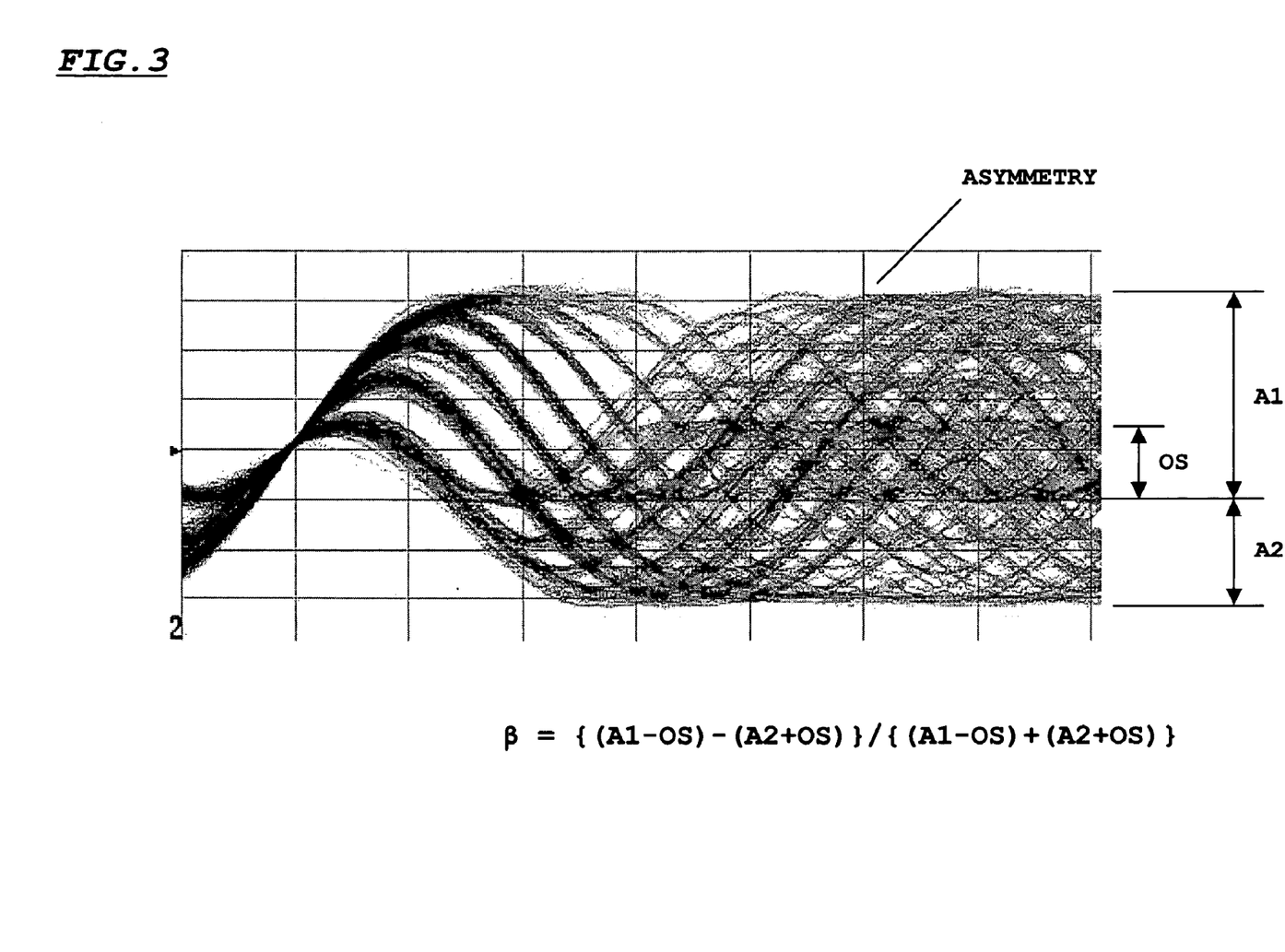
FIG. 3 is an explanatory diagram showing a β value calculating method in the embodiment of the present invention.

FIG. 3 is a diagram showing a β value calculation method. As shown in FIG. 3, the β value is calculated based on the asymmetry of a reproduction signal. That is, the β value is obtained using amplitude values A1 and A2 of the asymmetry and an offset value OS by the following expression.

$$\beta = \{(A1-OS)-(A2+OS)\}/\{(A1-OS)+(A2+OS)\} \quad (1)$$

Figure 4:
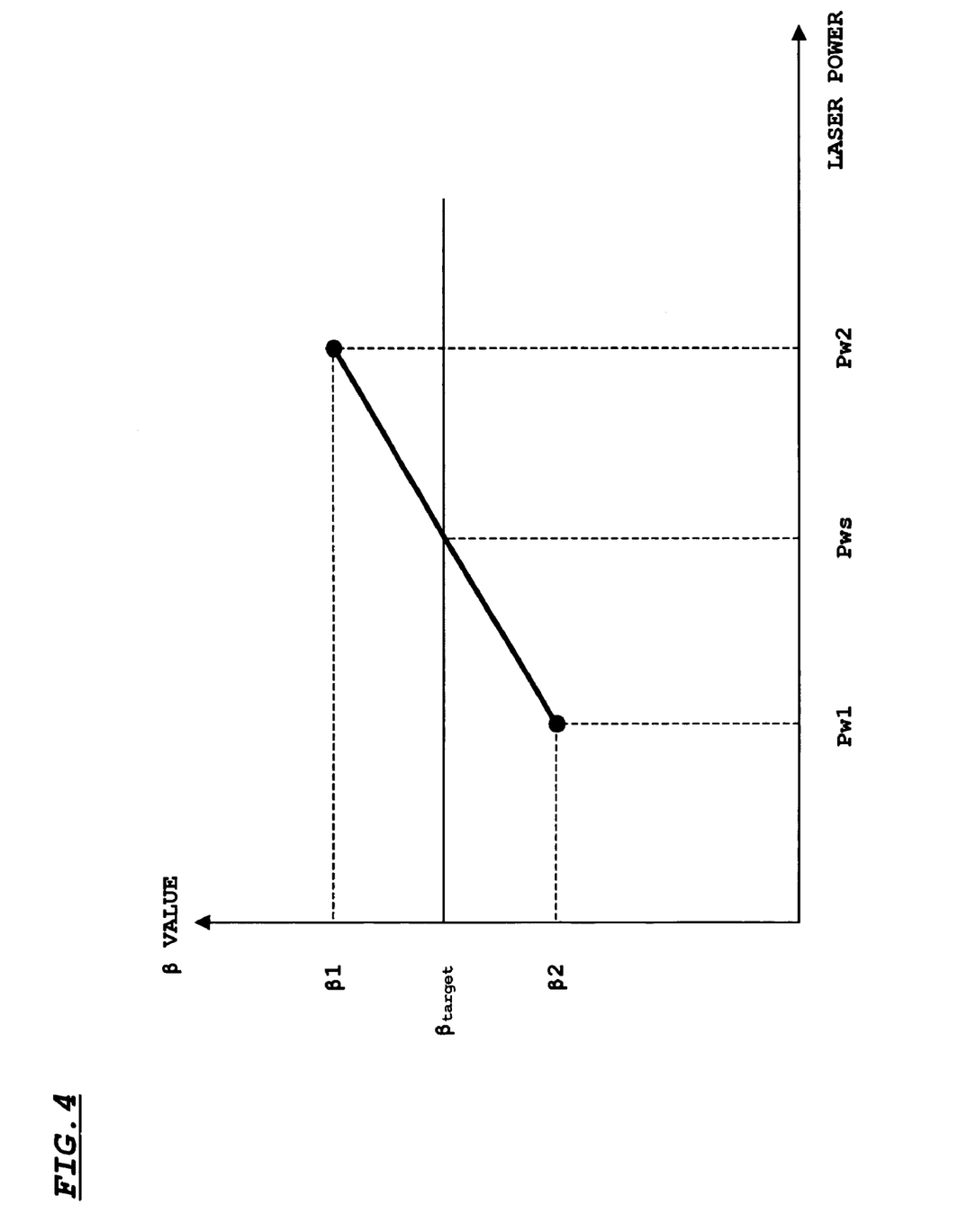
FIG. 4 is an explanatory diagram showing a laser power setting method in the embodiment of the present invention.

FIG. 4 is a diagram showing a method of setting recording laser power Pws (OPC). As shown in FIG. 4, the recording laser power Pws is obtained based on β values (β1 and β2) in the case where test data is recorded in any one of the inner disc test zone or the outer disc test zone at two predetermined kinds of laser powers (Pw1 and Pw2) and then reproduced. That is, a linear line is obtained based on the β values (β1 and β2). Then, an intersection point between the linear line and the β target of the disc 100 supplied from the controller 111 is obtained. Laser power corresponding to the obtained intersection point is set as the recording laser power Pws to the disc 100.

Next, adjustment operation for adjusting the recording laser power Pws set by the OPC during the recording operation.

Figure 5:
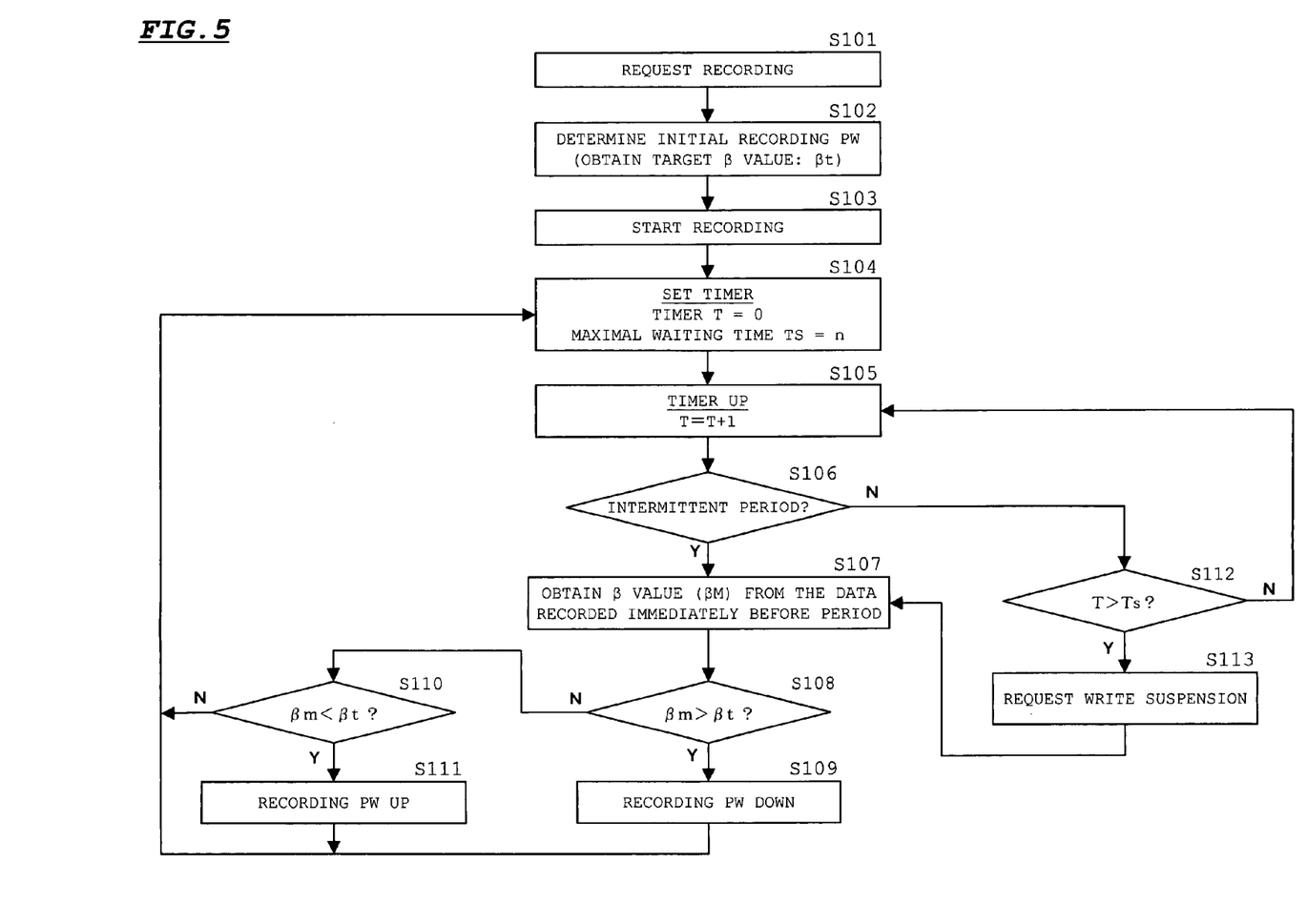
FIG. 5 is a flow chart showing laser power adjusting processing in the embodiment of the present invention.

FIG. 5 is a processing flow chart showing the adjustment operation.

When a recording operation start request is received (Step S101), the controller 111 obtains as described above the target of the disc 100 (hereinafter indicated as βt) from the β value table, causes the internal memory to store βt, and outputs βt to the laser power adjusting circuit 104. In response to this, the laser power adjusting circuit 104 sets as described above the recording laser power Pws to the disc 100 (Step S102). Then, the recording operation using the recording laser power Pws starts (Step S103).

When the recording operation thus starts, the controller 111 resets an internal timer T to zero and sets a maximal waiting time Ts to "n" (Ts=n) (Step S104). When the internal timer T is counted up by one (Step S105), it is determined at this timing whether or not an operational state is an intermittent standby state, that is, a recording standby state between the recording operation of a sequence and the recording operation of a next sequence shifted therefrom (Step S106).

When the recording operation is in the intermittent standby state (Step S106: Y), the controller 111 reads out recording data from an immediately preceding recording position by the predetermined number of blocks and calculates a β value (βm) for the blocks based on a reproduction signal of the recording data (Step S107). Then, the calculated βm is compared with βt obtained in Step S102. When βm>βt (Step S108: Y), the controller 111 outputs an adjustment value for reducing the set value of the recording laser power Pws by a predetermined value ΔPw to the laser power adjusting circuit 104.

In response to this, the laser power adjusting circuit 104 reduces the current set value of the recording laser power Pws by ΔPw and sets the reduced set value as new recording laser power Pws. Therefore, the recording laser power of the laser light emitted from the optical pickup 105 is reduced by a predetermined level. After the intermittent standby state, the recording operation is performed using the reduced recording laser power (Step S109).

On the other hand, in a case where βm>βt is determined when βm calculated in Step S107 is compared with βt obtained in Step S102 (Step S110: Y), the controller 111 outputs an adjustment value for increasing the set value of the recording laser power Pws by the predetermined value ΔPw to the laser power adjusting circuit 104.

In response to this, the laser power adjusting circuit 104 increases the current set value of the recording laser power Pws by ΔPw and sets the increased set value as new recording laser power Pws. Therefore, the recording laser power of the laser light emitted from the optical pickup 105 is increased by a predetermined level. After the intermittent standby state, the recording operation is performed using the increased recording laser power (Step S111).

When the recording laser power is thus set again, processing returns to Step S104. The controller 11 resets the internal timer T to zero and sets the maximal waiting time Ts again. Then, as described above, the laser power adjusting operation using an intermittent standby period (R-OPC) is performed.

When the recording operation is not in the intermittent standby state at a timing when the internal timer T is counted up by one in Step S105 (Step S106: N), the controller 111 compares a count value of the internal timer T with the maximal waiting time Ts. When T>Ts (Step S112: Y), the recording operation is suspended (Step S113) and the system is set to the intermittent standby state. Then, the recording laser power is set again by processings from Step S107 onwards. Upon the completion of resetting of the recording laser power (Step S111, S109, or S110: N), the system is returned to the recording operation. After that, in Step S104, the internal timer is reset to zero and the maximal waiting time Ts is set again. When T<Ts in Step S112, processing returns to Step S105 and subsequent processings are executed.

Figure 6:
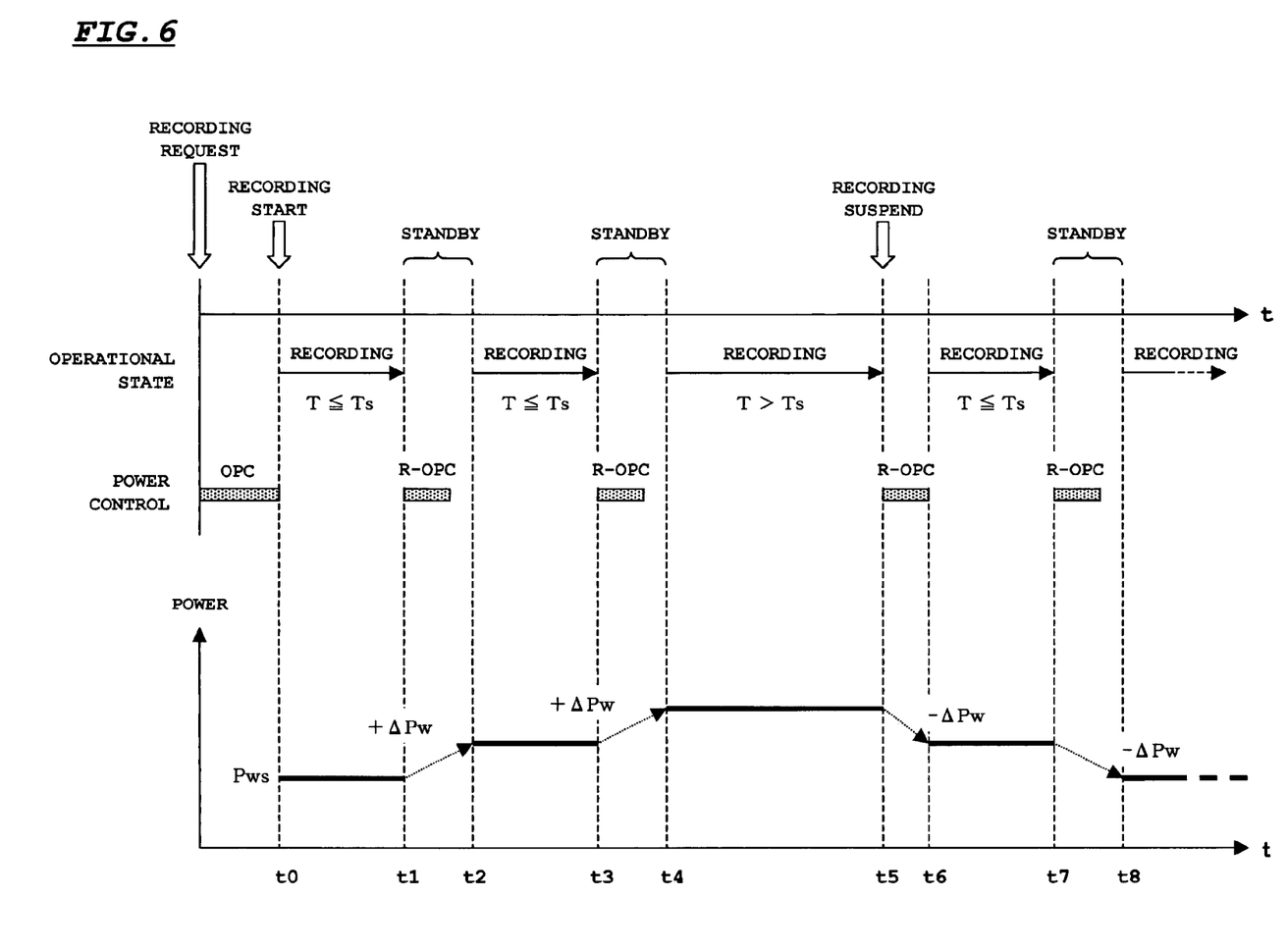
FIG. 6 is a timing chart showing laser power adjustment in the embodiment of the present invention.

FIG. 6 is a timing chart showing the laser power adjusting operation based on the above-mentioned processing flow.

When a recording request is inputted to the system, the OPC is executed to set the initial recording laser power Pws (0 to t0). After the start of recording, the recording is performed based on the set recording laser power Pws (t0 to t1).

After that, when the system becomes the intermittent standby state (t1 to t2), the R-OPC is executed. Therefore, as described above, the recording laser power Pws is adjusted and set again. Then, the recording operation is performed based on the recording laser power Pws which was set again (t2 to t3). After that, when the system becomes the intermittent standby state again (t3 to t4), the R-OPC is executed, so that the recording laser power Pws is adjusted and set again. Then, the recording operation is performed based on the recording laser power Pws which was set again (t4 to t5).

When the recording operation continues in excess of the maximal waiting time Ts (t5), the recording operation is suspended and the system is set to the recording standby state (t5 to t6). Then, the R-OPC is executed, so that the recording laser power Pws is adjusted and set again. When the adjustment and resetting of the recording laser power Pws are completed (t6), the system returns to the recording operation. After that, as described above, the R-OPC is executed, so that the recording laser power Pws is adjusted and set again (t6 to t8, ...).

Therefore, according to this embodiment, the R-OPC is performed during the intermittent standby period other than the recording operational period. Thus, the R-OPC is not performed in parallel with the recording operation, with the result that the processing sequence in recording can be made less complicated.

According to this embodiment, information which has been recorded by the previous recording operation is reproduced and the recording laser power is adjusted (R-OPC is performed) based on the β value of the reproduction signal. Therefore, for example, even when the sensitivity of the recording layer is changed by the wavelength shift of the laser light, it is possible to set an adequate power adjustment value. Thus, the recording laser power can be smoothly adjusted while recording characteristics are improved.

In particular, according to this embodiment, recording information corresponding to several blocks recorded immediately before the intermittent standby period is reproduced to adjust the recording laser power (perform the R-OPC). Therefore, an adjustment value of the recording laser power applied to next recording operation can be set based on the β value of recording information close to the next recording operation in terms of time and position. Thus, the adjustment value for the recording operation can be adequately set without an error.

According to this embodiment, when the duration (T) of the recording operation exceeds the maximal waiting time Ts, the recording operation is suspended and the R-OPC is executed. Therefore, it is possible to prevent the previous recording laser power from being undesirably maintained, so that the set value of the recording laser power can be smoothly adjusted.

According to this embodiment, βt is compared with βm, and the correction value ΔPw is added to or subtracted from the set value of the recording laser power Pws based on a relationship between both values without exception. Therefore, adjustment processing can be simplified, so that a processing load during the laser power adjustment can be reduced.

Figure 7:
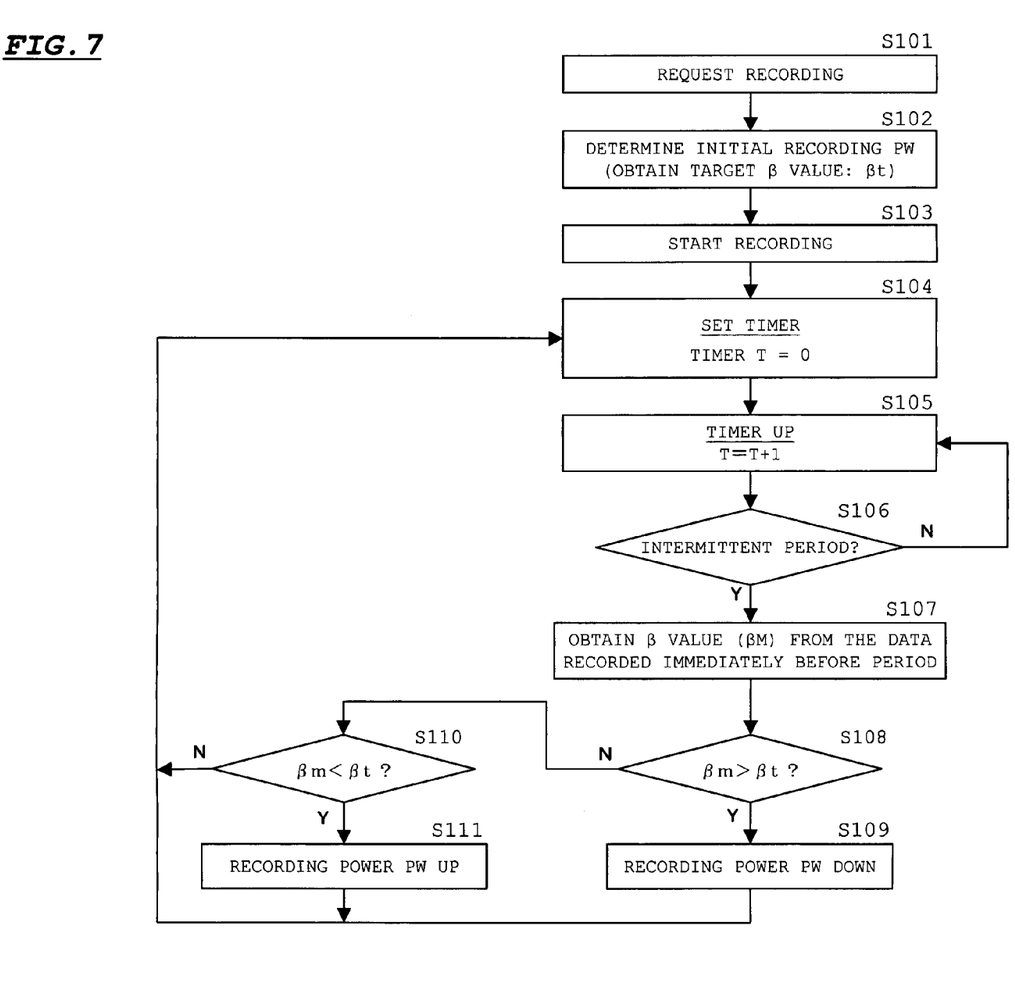
FIG. 7 a flow chart showing laser power adjusting processing in a modified example of the embodiment of the present invention.

According to this embodiment, when the duration of the recording operation exceeds the maximal waiting time, the recording operation is forcedly suspended and the R-OPC is executed. Instead, as shown in FIG. 7, the R-OPC may be executed only at the time of the intermittent standby state other than the recording operation. That is, Steps S112 and S113 in the processing flow chart shown in FIG. 6 are omitted in the processing flow chart shown in FIG. 7. When it is determined that the operating state is not in the intermittent standby state in Step S106, processing returns to Step S105 and the timer is counted up. Even in the case of the processing flow chart shown in FIG. 7, the laser power is adjusted as appropriate during the intermittent standby period. Therefore, it is possible to realize the adequate laser power. Note that in the processing flow chart shown in FIG. 7, which is different from that in this embodiment, the adequate adjustment of the laser power is likely to cause a slight delay time.

In this embodiment, the DVD+R disc is used as a medium. Of course, the present invention can be applied to an optical disc device adaptable to a medium other than the DVD+R disc. In this case, it is necessary to suitably change a laser power setting and adjusting method according to a kind of the medium.

In this embodiment, βt is compared with βm, and the correction value ΔPw is added to or subtracted from the set value of the recording laser power Pws based on a relationship between both values without exception. Alternatively, for example, an adjustment value corresponding to a difference between βt and βm may be determined to be added to or subtracted from the set value of the recording laser power Pws. Other adjusting methods may also be employed.

As described above, the β value table is held in the controller 111 and the β target (βt) of the disc 100 is obtained from the β value table. Alternatively, the laser power may be set and adjusted using the β target of the disc 100 which is directly obtained from the read-in (ADIP) of the disc 100.

Further, the embodiment of the present invention allow various changes and modifications as appropriate within the scope of the technical idea of the present invention as set forth in the appended claims.

What is claimed is:

1. An optical disc device for recording and reproducing information on and from a write-once-type disc using laser light, comprising:

a laser power setting circuit for setting recording laser power by trial writing of test information in the write-once-type disc, the trial writing being performed before a recording operation provided for recording data on the write-once-type disk; and a controller for performing control to reproduce the data recorded during the recording operation, the data being reproduced during an intermittent standby period when the recording operation is not performed, the controller further performing control to adjust a set value of the recording laser power which is set by the laser power setting circuit, the set value of the recording laser power being adjusted based on a β value of a reproduction signal produced when the recorded data are reproduced, the β value being a ratio between {(A1−OS)−(A2+OS)} and {(A1−OS)+(A2+OS)}, where A1 and A2 are amplitude values representing asymmetry of the reproduction signal, and OS is an offset value, wherein:

the laser power setting circuit sets the recording laser power based on a target β value of the reproduction signal which is required for the write-once-type disc, and the controller compares a β value obtained from the reproduction signal with the target β value and adds or subtracts a predetermined adjustment value to or from the set value of the recording laser power based on a relationship between the β value obtained from the reproduction signal and the target β value.

2. An optical disc device according to claim 1, wherein the controller performs control to reproduce recording data corresponding to blocks recorded immediately before the intermittent standby period and to adjust the set value of the recording laser power based on a state of a reproduction signal of the recording data.

3. An optical disc device according to claim 1, wherein the controller subtracts the predetermined adjustment value from the set value of the recording laser power when the β value obtained from the reproduction signal is larger than the target β value and adds the predetermined adjustment value to the set value of the recording laser power when the β value obtained from the reproduction signal is smaller than the target β value.

4. An optical disc device according to claim 1, wherein when a duration of the recording operation exceeds a predetermined set time, the controller suspends the recording operation, sets the intermittent standby period, and adjusts the recording laser power during the set intermittent standby period.

5. An optical disc device according to claim 4, wherein when the recording operation is suspended to adjust the recording laser power, a recording state is returned to the recording operation in response to the completion of the recording laser power adjustment.

* * * * *